(12) United States Patent
Drocco

(10) Patent No.: US 10,458,528 B2
(45) Date of Patent: Oct. 29, 2019

(54) SYSTEM FOR OVERTURNING TANKS OF KNEADING MACHINES

(71) Applicant: Sancassiano S.p.A., Roddi d'Alba (Cuneo) (IT)

(72) Inventor: Davide Drocco, Roddi d'Alba (IT)

(73) Assignee: SANCASSIANO S.P.A., Roddi d'Alba (Cuneo) (IT)

( * ) Notice: Subject to any disclaimer, the term of this patent is extended or adjusted under 35 U.S.C. 154(b) by 321 days.

(21) Appl. No.: 15/223,563

(22) Filed: Jul. 29, 2016

(65) Prior Publication Data
US 2017/0059018 A1    Mar. 2, 2017

(30) Foreign Application Priority Data

Sep. 2, 2015  (IT) .................. 102015000047897

(51) Int. Cl.
*B65G 65/23* (2006.01)
*B66F 9/00* (2006.01)
*F16H 21/44* (2006.01)
*B01F 15/02* (2006.01)

(52) U.S. Cl.
CPC ......... *F16H 21/44* (2013.01); *B01F 15/0295* (2013.01); *B65G 65/23* (2013.01); *B66F 9/00* (2013.01)

(58) Field of Classification Search
CPC ...... F16H 21/44; B01F 15/0295; B01F 15/02; B65G 65/23; B66F 9/00; A21C 1/14; A21C 1/142; A21C 1/1445
USPC .......... 74/99 R; 414/425; 220/315; 222/166; 292/209
See application file for complete search history.

(56) References Cited

U.S. PATENT DOCUMENTS

| | | | | | |
|---|---|---|---|---|---|
| 3,294,266 | A | * | 12/1966 | Snow | B65F 1/12 248/133 |
| RE26,988 | E | * | 11/1970 | Allen | B66F 9/19 414/424 |
| 4,400,127 | A | * | 8/1983 | Metz | B65G 69/003 14/71.1 |
| 4,447,185 | A | * | 5/1984 | Robinson | B65G 65/23 414/391 |
| 4,948,324 | A | * | 8/1990 | Niederer | B60P 1/34 298/17.5 |
| 7,367,597 | B2 | * | 5/2008 | Rechberg | A47G 25/065 292/300 |

(Continued)

FOREIGN PATENT DOCUMENTS

| | | | | |
|---|---|---|---|---|
| CH | 401833 A | | 10/1965 | |
| CH | 482939 | * | 12/1969 | ............. B65G 69/18 |
| CH | 482939 A | * | 12/1969 | ............. B65G 65/23 |

(Continued)

OTHER PUBLICATIONS

Corresponding Italian Search Report for Italian application No. 102015000047897 completed on May 12, 2016.

Primary Examiner — Victor L MacArthur
Assistant Examiner — Gregory Robert Weber
(74) Attorney, Agent, or Firm — Heslin Rothenberg Farley & Mesiti P.C.; Victor A. Cardona, Esq.

(57) ABSTRACT

A system for overturning tanks of kneading machines includes an overturning unit provided with means for fixing a tank to itself. The means for fixing has an elastic actuation member, which is loaded by exploiting the downward movement of the overturning unit.

10 Claims, 4 Drawing Sheets

(56) References Cited

U.S. PATENT DOCUMENTS

2013/0220043 A1* 8/2013 Hsu .................. F16H 21/44
                                                                                          74/101
2015/0009498 A1* 1/2015 Zell .................. G01B 11/27
                                                                                         356/399

FOREIGN PATENT DOCUMENTS

| CH | 482939 | A |   | 12/1969 |          |           |
|----|--------|---|---|---------|----------|-----------|
| EP | 2392212 | A1 | * | 12/2011 | ............ | A21C 1/149 |
| GB | 1090867 |   | * | 11/1967 | ............ | B28C 7/161 |
| GB | 1090867 | A | * | 11/1967 | ............ | B28C 7/161 |

\* cited by examiner

SYSTEM FOR OVERTURNING TANKS OF KNEADING MACHINES

CROSS-REFERENCE TO RELATED APPLICATIONS

This application claims priority to Italian Patent Application No. 102015000047897 filed on Sep. 2, 2015, the entire disclosure of which is incorporated by reference.

FIELD OF THE INVENTION

The present invention regards a system for overturning tanks, in particular tanks of kneading machines.

BACKGROUND OF THE INVENTION

As is known in the art, one of the ways of unloading the dough envisaged for some types of kneading machines contemplates taking the tank out of the machine and then turning it over so that the dough can drop out of the tank by gravity. Overturning is carried out above conveyor means designed to carry the dough prepared to subsequent treatment and/or handling stations, for example a line for baking of the dough or else a packaging line.

SUMMARY OF THE INVENTION

The overturning operation described above is obtained precisely via an overturning system, which in its general configuration, comprises:
  a supporting structure; and
  an overturning unit, which is mobile along the structure between a lowered position and a raised position and is rotatable about an axis transverse to the vertical direction.

The overturning unit is provided with means for clamping the tank on itself in order to render possible overturning thereof without it possibly sliding and falling off the unit. In the systems known in the art, these means are either of a manual type, i.e., constituted by levers or hooks designed to be brought manually into engagement with the tank, or else of an automatic type, i.e., constituted by appropriate hydraulic or electromechanical systems designed to actuate in an automatic way corresponding members for clamping the tank.

The second type of clamping means referred to above is currently the preferred one on the market in so far as it is more reliable and makes it possible, for example, to carry out on the tank, in its respective overturned condition, automatic cleaning operations, which, in general, envisage bringing a scraper member into contact with the inner walls of the tank and setting the latter in rotation via appropriate mechanical means, for example friction or meshing means. The clamping means in question present, however, the drawback of complicating considerably the structure of the system, not only in so far as they require a complete hydraulic or electrical circuit and a dedicated control unit, but also in so far as, together with them, a system is necessary for guiding the tubes or electrical cables of the circuit for these to be able to follow all the movements of the unit.

Clamping means of a manual type are simpler and less costly but evidently impose a series of limits on operation of the system.

The object of the present invention is to provide an overturning system that will overcome the aforesaid drawbacks. The object indicated is achieved by a system that presents the characteristics indicated in claim 1.

The claims form an integral part of the technical teaching provided herein in relation to the invention.

BRIEF DESCRIPTION OF THE DRAWINGS

Further characteristics and advantages of the invention will emerge clearly from the ensuing description with reference to the annexed drawings, which are provided purely by way of non-limiting example and in which.

DETAILED DESCRIPTION OF THE INVENTION

Figure 1:
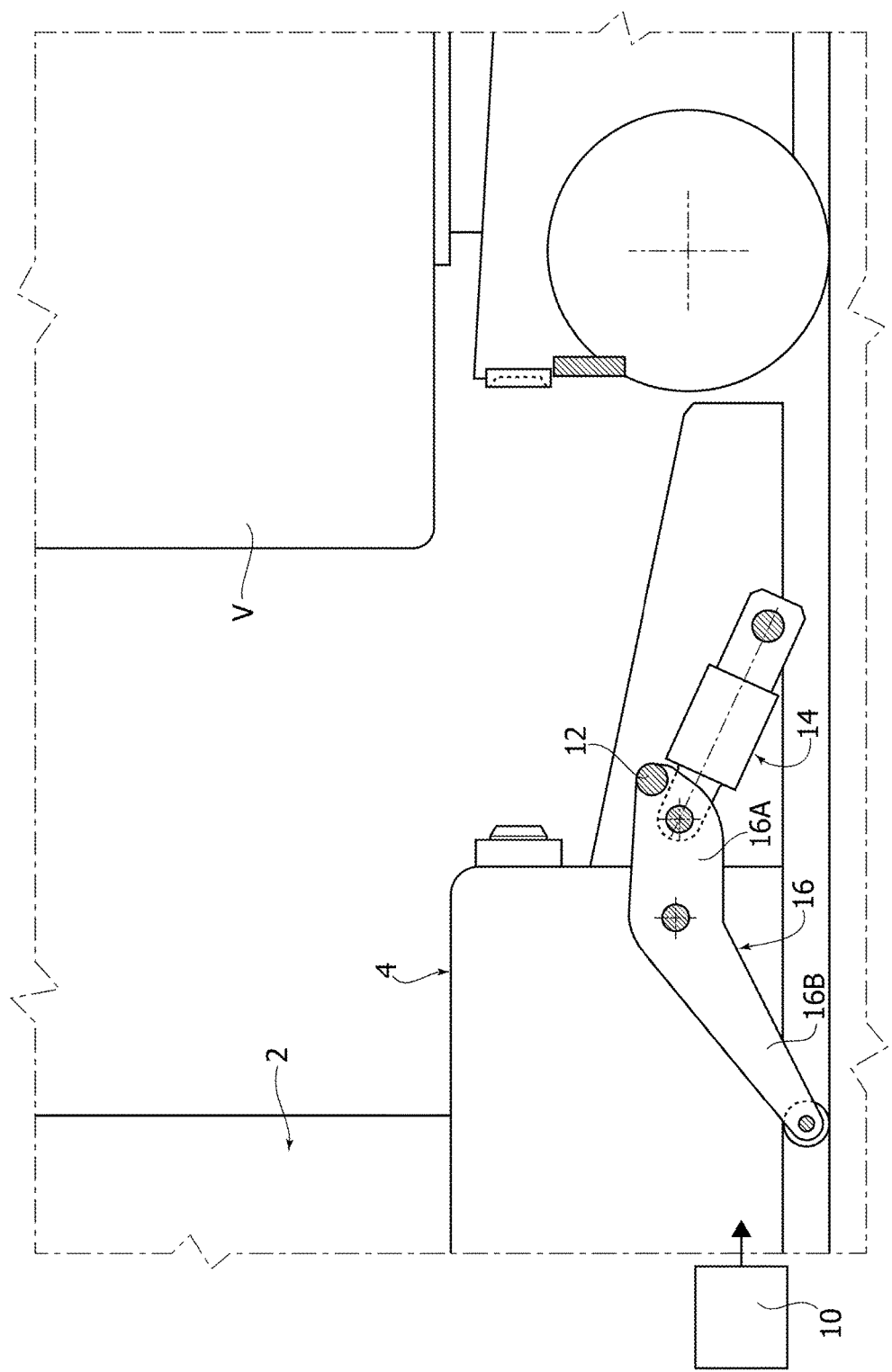
FIGS. 1-4 are schematic illustrations of an embodiment of the system described herein in different respective conditions of operation.

In the ensuing description, various specific details are illustrated aimed at enabling an in-depth understanding of the embodiments. The embodiments may be provided without one or more of the specific details, or with other methods, components, or materials, etc. In other cases, known structures, materials, or operations are not shown or described in detail so that various aspects of the embodiment will not be obscured.

The references used herein are only provided for convenience and hence do not define the sphere of protection or the scope of the embodiments.

As mentioned above, the system described herein carries out the function of overturning tanks of kneading machines in order to unload the dough prepared therein.

In particular, the system described herein is designed to operate with kneading machines provided with extractable tanks, i.e., tanks that can be taken out of the machine and easily moved to reach the overturning system in the area where the dough is to be unloaded.

In general, the system described herein comprises a vertical supporting structure 2, and an overturning unit 4, mobile along said structure between a lowered position and a raised position, to which the tank V of a kneading machine, containing the dough to be unloaded, is to be fixed.

The supporting structure and the lifting and overturning unit associated thereto are represented only partially and schematically in the figures and not will be described in further detail herein in so far as they do not fall within the innovative aspects of the system described herein and can be obtained according to any configuration known in the art.

The overturning unit has appropriate means for fixing of the tank to the unit itself, which are in particular pre-arranged so that, during overturning, the tank is kept by them tightly fixed to the unit, without the possibility of moving, even minimally.

The system described herein is characterized in that the fixing means indicated are of an automatic type but do not require an actuator specifically dedicated thereto, in so far as they exploit for their activation/de-activation the upward and downward movement of the unit.

In general, the above means comprise:
  a section or body 12, which is pre-arranged for engaging the tank and which can be driven between an inoperative position and an operative position;
  an elastic member 14, which can be activated into a loaded condition thereof and is connected to the body 12 for driving the latter into the aforesaid operative position; and tappet means 16 connected to the elastic member 14, which are pre-arranged for co-operating with a fixed surface during displacement of the overturning unit from the raised position to the lowered position so as to bring the elastic member 14 into the loaded condition.

By the term "tappet means" is here meant follower means for transmission of motion, which are hence able to transmit to means connected thereto the action exerted thereon by a surface acting as cam surface. In the case described herein, the surface in question is represented by the fixed surface indicated above, which comes to act as surface that moves as a result of the downward movement of the overturning unit, against said surface.

In various embodiments, as in the one illustrated, the tappet means are constituted by a rocker member 16, which is articulated, about a substantially horizontal axis, to the structure of the unit, and bears the body 12 on its end facing the front side of the system. The arm 16A of this member by which the body 12 is carried is connected in an articulated way to a first end of the elastic member 14, which is in turn articulated to the structure of the unit at its opposite end. The arm 16B of the rocker member 16, opposite to the one provided with the engagement body 12, is, instead, pre-arranged for co-operating—as will be described in what follows—with a fixed surface of the system itself or else of an external element, for example the floor surface or else a purposely provided platform, which faces in the direction opposite to the direction followed by the unit during the its downward movement.

The elastic member 14 is configured for working in compression and is "loaded" in its own contracted condition. In various preferred embodiments, the elastic member may be constituted by a compression spring of a mechanical or pneumatic type.

The elastic member 14 is connected to the rocker member 16 so as to exert thereon an action tending to turn it—in the counterclockwise direction in the example illustrated—so as to displace the body 12 upwards, in order to bring it into its operative position. Moreover, the arm 16B of the member 16 is pre-arranged for co-operating with the aforesaid fixed surface, during the downward movement of the unit, so that the latter will induce a rotation of the member 16 itself in the direction opposite to the rotation induced by the elastic member 14—in the clockwise direction in the example illustrated—, in order to bring the body 12 back into its inoperative position and at the same time load the elastic member 14. In various preferred embodiments, as in the one illustrated, the end of the arm 16B may be provided with a wheel so as to reduce friction with the fixed surface referred to above generated by sliding of the arm 16B on the surface. It should be noted that, when the body 12 is in the operative position, the force with which the tank is gripped to the unit 4 is determined by the thrust that the elastic member 14 exerts on the rocker member 16.

For a better understanding of operation of the means described, reference will now be made to the sequence of the steps illustrated in FIGS. 1 to 4.

FIG. 1 shows the unit in its lowered condition, ready for receiving a new tank from which to unload the dough.

In this condition, the body 12 is in its inoperative position, and the elastic member 14 is, instead, in its loaded condition, as a result of engagement of the rocker member 16 by the floor surface, which imposes on the rocker member 16 a torque in the clockwise direction.

Figure 2:
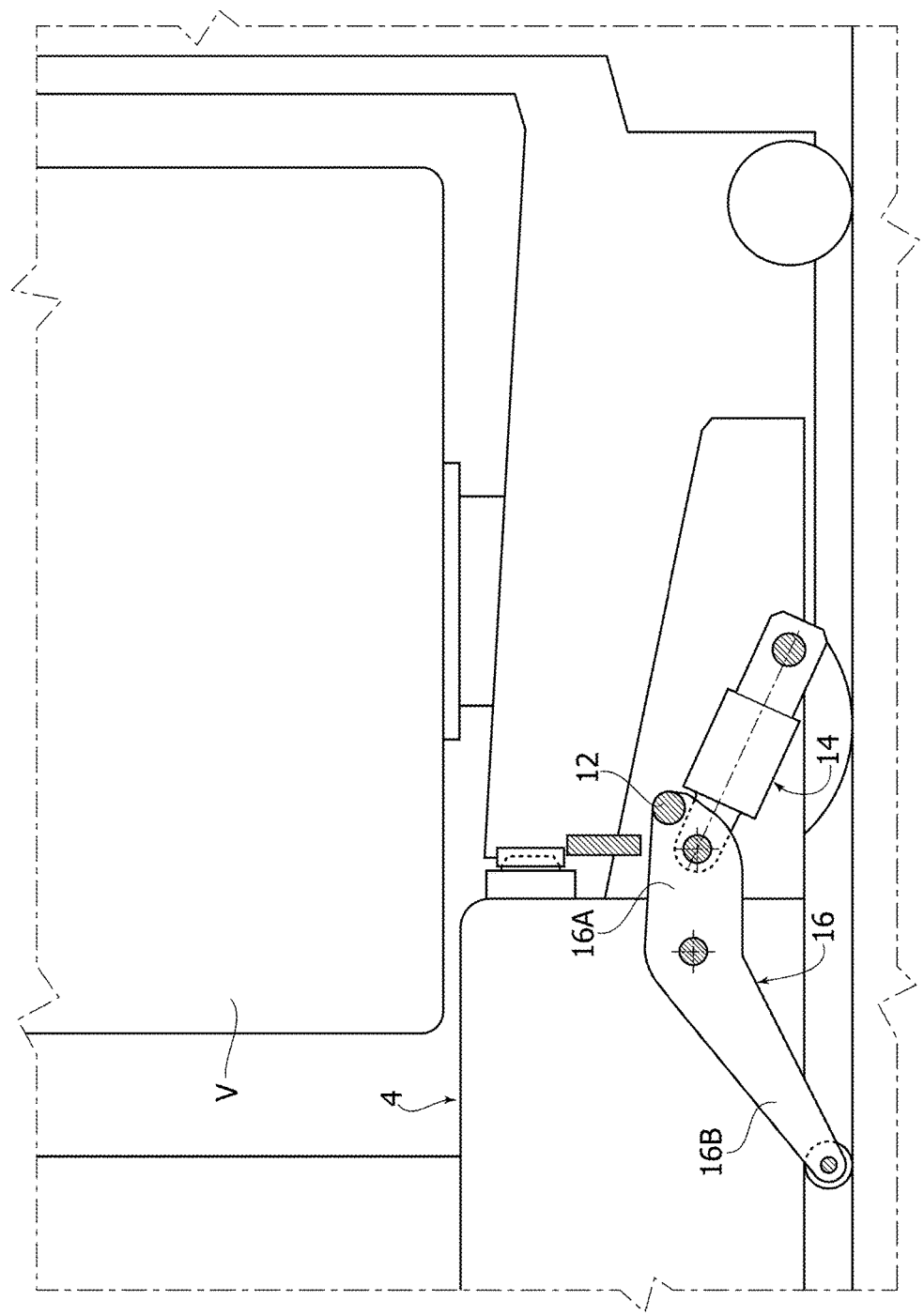

The tank can hence be brought onto the lifting platform of the unit. In various preferred embodiments, as in the one illustrated, the unit and the tank may present corresponding positioning means designed for mutual engagement to bring about proper positioning of the tank on the platform. FIG. 2 illustrates the tank correctly positioned on the unit.

Figure 3:
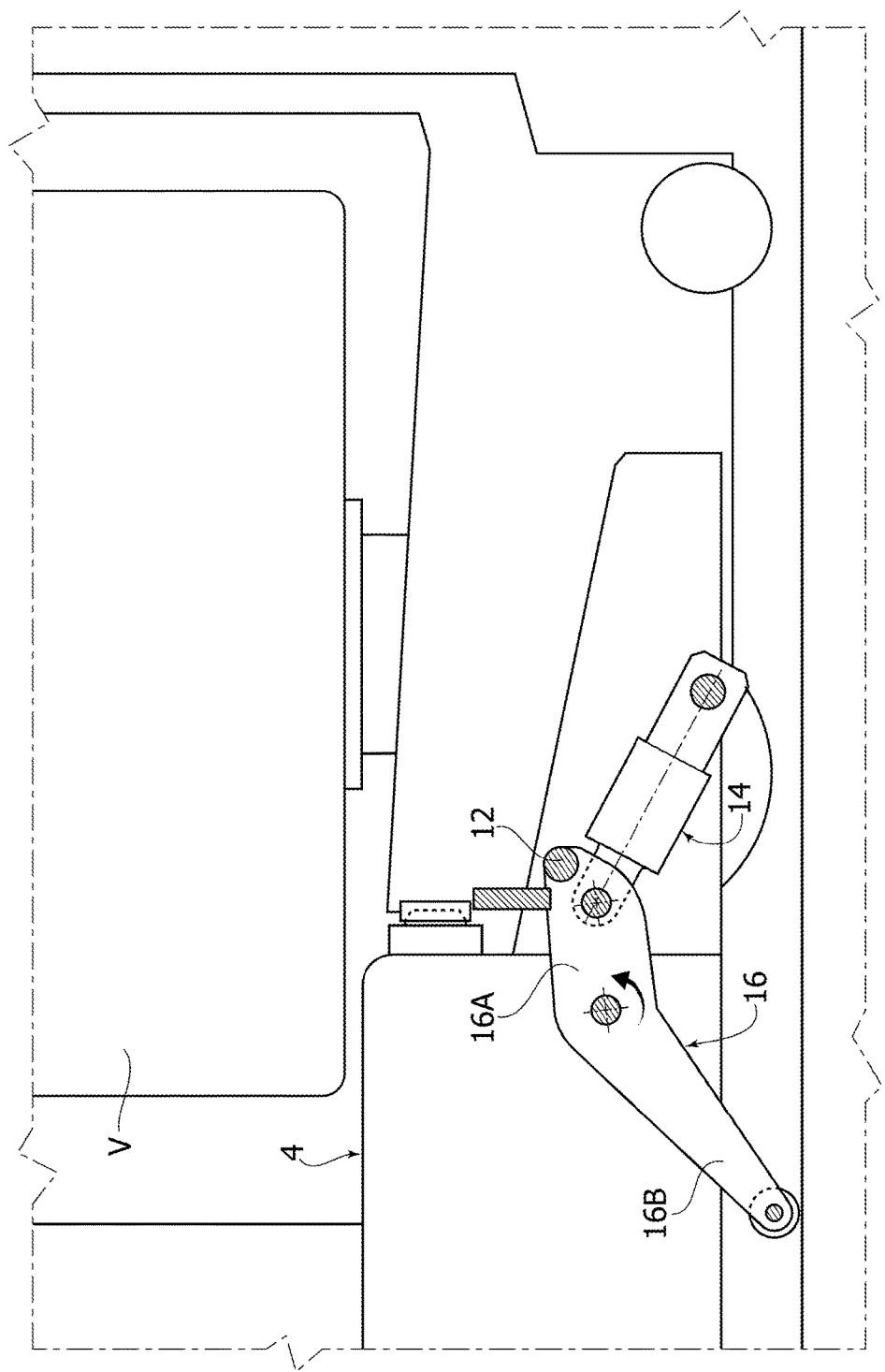
Figure 4:
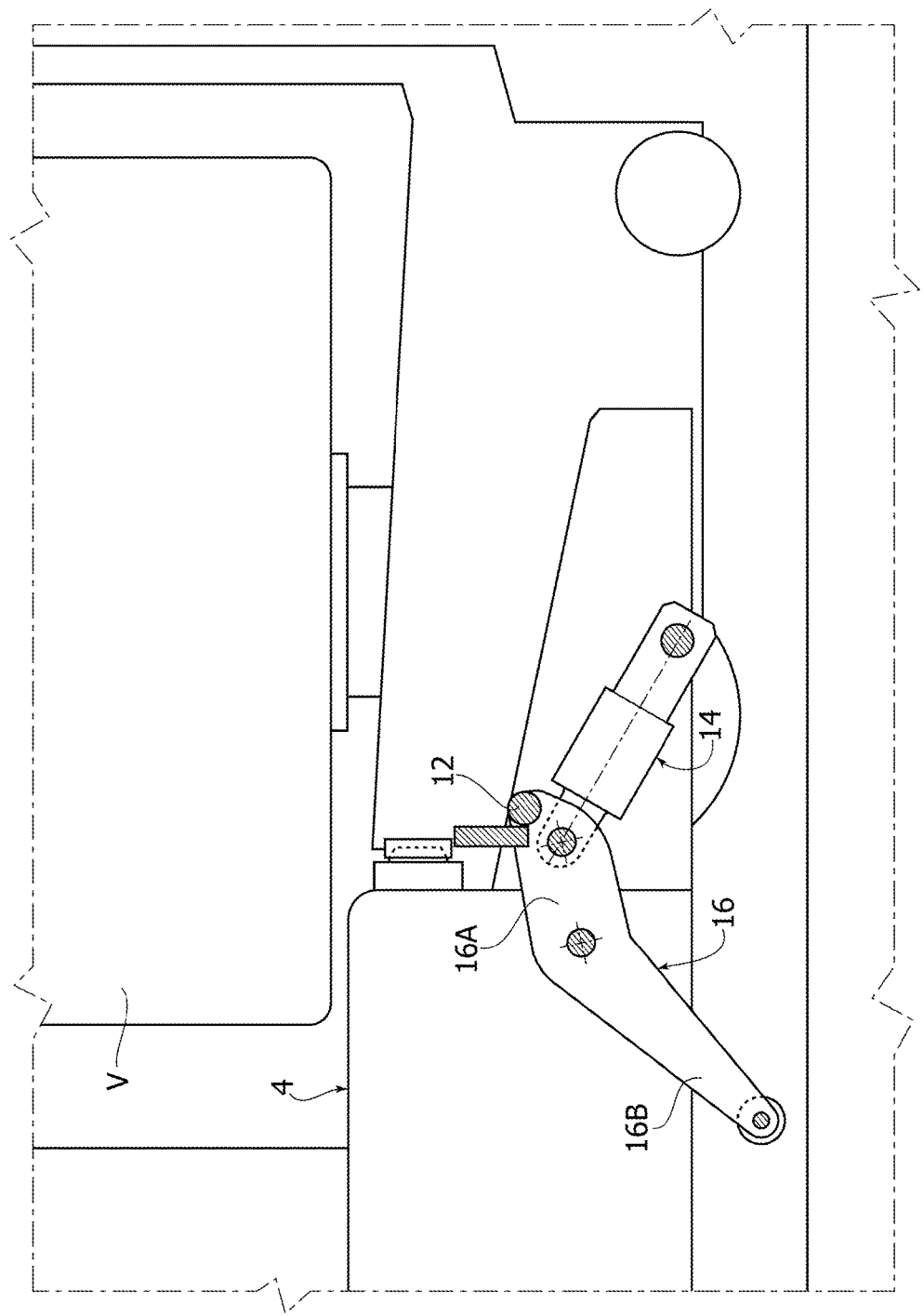

Starting from this condition, as the unit rises, the elastic member 14 causes rotation of the rocker member in the counterclockwise direction, until the body 12 is brought to engage the corresponding section of the tank (FIGS. 3 and 4).

In various preferred embodiments, the system envisages control means—schematically represented in FIG. 1 by block 10—configured to drive raising of the unit for an initial stroke that is limited (preferably just a few centimeters), but sufficient to determine actuation of the means described for fixing the tank to the unit.

In various preferred embodiments, the control means of the system further comprise a sensor (not illustrated), for example a contact sensor, via which it can be verified that fixing of the tank to the unit has been carried out correctly. The control means are configured for driving movement of the unit on the basis of the signal received from said sensor; in particular, the control means are configured for bringing the unit back into the lowered position in the case where, via the sensor, a fault is detected in fixing between the tank and the unit, and are configured for enabling instead continuation of raising of the unit, if fixing thereof is correct.

Once the operation of fixing of the tank is terminated, the system can operate thereon according to the modalities already known in the art for enabling unloading of the dough.

When the unit is finally brought back, after unloading of the dough, into its lowered position, as a result of co-operation with the surface of the floor, the rocker member 16 rotates clockwise, bringing the body 12 back into its inoperative position and the elastic member 14 into its loaded condition.

It should now be noted that the fixing means described herein provide a connection that is as safe and effective as the one provided via the hydraulic and electromechanical systems described at the start, enabling, amongst other things, as in the case these known systems, the automatic scraping/washing operations described above to be carried out on the overturned tank. As compared to these known automatic systems, there clearly emerges, on the other hand, the considerable simplification that characterizes these means, with the corresponding advantages in terms of costs and reliability.

Finally, it is clear that the system described herein may be used for overturning tanks belonging to any machine for treatment of foodstuff products (for example, leavening machines) and not only tanks of kneading machines.

Of course, without prejudice to the principle of the invention, the details of construction and the embodiments may vary, even significantly, with respect to what is illustrated herein purely by way of non-limiting example, without thereby departing from the scope of the invention, as defined by the annexed claims.

The invention claimed is:

1. A system for use in overturning tanks of kneading machines, said system comprising:
   a supporting structure; and
   an overturning unit mobile along said structure between a lowered position, in which it receives the tank to be overturned, and a raised position, in which it overturns said tank;
   wherein said unit comprises:

a body for engaging said tank, which is mobile between an inoperative position and an operative position;

an elastic member, which can be activated into a loaded condition;

a rocker member pre-arranged for co-operating with a fixed surface during displacement of said unit from said raised position to said lowered position to bring said elastic member into said loaded condition and to move said body into said inoperative position;

said elastic member configured to move from said loaded condition to cause movement of said rocker member to move said body into said operative position to engage the tank.

2. The system according to claim 1, wherein said elastic member is pre-arranged for moving said engagement body upwards, up to said operative position.

3. The system according to claim 2, wherein the rocker member carries said engagement body of said tank.

4. The system according to claim 1, wherein the rocker member carries said engagement body of said tank.

5. The system according to claim 4, wherein said rocker member comprises a first arm, which carries said engagement body, and a second opposite arm, which is designed to co-operate with said fixed surface, and wherein said elastic member engages said first arm.

6. The system according to claim 5, wherein said elastic member is articulated, at a first end thereof, to said first arm of said rocker member, and, at a second opposite end, to the structure of said unit.

7. The system according to claim 1, wherein said unit is located in a position sufficient for said body to be brought into said operative position by said elastic member.

8. The system according to claim 7, further comprising a sensor for verifying whether fixing of the tank to the unit is carried out.

9. A method for use in overturning tanks, the method comprising;

activating an elastic member connected to a rocker arm from a loaded condition to move an engagement body connected to the rocker arm from an inoperative position into an operative position to engage a tank;

moving an overturning unit along a supporting structure between a lowered position, in which said overturning unit receives said tank, and a raised position, in which said overturning unit overturns said tank; and displacing said overturning unit from said raised position to said lowered position and said rocking member cooperating with a fixed surface to bring said elastic member into said loaded condition.

10. The method according to claim 9, further comprising the following steps:

raising said unit up to a first pre-determined height so that said engagement body is brought by said elastic member into said operative position;

verifying via a sensor whether fixing of said tank to said unit is carried out correctly;

in the case where said fixing has been carried out correctly, raising further said unit up to said raised position;

in the case where said fixing has not been carried out correctly, bringing said unit back into said lowered position.

* * * * *